United States Patent [19]

[11] 3,764,812

Kiyasu et al.

[45] Oct. 9, 1973

[54] ADDRESS SELECTION SYSTEM

[75] Inventors: Zenichi Kiyasu; Tsutomu Nakamura, both of Tokyo, Japan

[73] Assignee: Iwatsu Electric Co., Ltd., Tokyo, Japan

[22] Filed: Dec. 27, 1971

[21] Appl. No.: 211,914

[30] Foreign Application Priority Data

Dec. 28, 1970 Japan .............................. 45/119449

[52] U.S. Cl. ......................... 250/213 A, 250/220 M

[51] Int. Cl. ............................................ H01j 31/50

[58] Field of Search ............ 250/209, 213 A, 219 D, 250/219 DD, 219 DC, 220 M; 340/173 LM, 173 LT, 172.5; 350/169; 328/123; 307/311

[56] References Cited

UNITED STATES PATENTS

| | | | |
|---|---|---|---|
| 3,488,636 | 1/1970 | Dyck | 250/220 M |
| 3,526,880 | 9/1970 | Filippazzi | 340/173 LT |
| 3,407,405 | 10/1968 | Hoadley | 340/173 LT |
| 3,480,780 | 11/1969 | List | 250/220 M |
| 3,191,040 | 6/1965 | Critchlow | 250/220 M |
| 3,631,411 | 12/1971 | Kosonocky | 250/219 D |
| 3,317,712 | 5/1967 | Silverman | 250/219 D |
| 3,676,866 | 7/1972 | Freedman | 340/173 LT |
| 3,660,667 | 5/1972 | Weimer | 250/220 M |

*Primary Examiner*—James W. Lawrence
*Assistant Examiner*—D. C. Nelms
*Attorney*—Allan Ratner

[57] ABSTRACT

An address selection system for a memory units, of a plurality of address circuits, the number of which corresponds to the number of addresses in a memory unit, have a plurality of networks, each of which has a plurality of photo-electromotive conversion elements. A light pattern illuminates said photo-electromotive conversion elements, such that one of said address circuits responds and provides output voltage higher than that of those unselected. The present invention can be performed without transformers, and provides a highly reliable, miniaturized, memory system with integrated circuits.

11 Claims, 20 Drawing Figures

PATENTED OCT 9 1973 3,764,812

SHEET 2 OF 9

ADDRESS SELECTION SYSTEM

This invention relates generally to an address selection system of a memory unit for an information processing equipment such as an electronic computer or an electronic switching, and more particularly, relates to an address selection system for contemporary large fast and highly reliable memory units with the use of integrated circuits.

The conventional address selection system, which will be described later, has a matrix with pairs of diodes and transformers, which has the disadvantage that it is impossible to manufacture the system with integrated circuits on account of the presence of the transformers.

The object of the present invention is to provide a system which overcomes this disadvantage.

A further object of the present invention is to provide an improved and new address selection system which makes possible the manufacture of miniaturized highly reliable information processing equipment.

Another object of the present invention is to provide an improved address selection system, which can be manufactured easily using large scale integrated circuits, having photodiodes.

Further features and advantages of the present invention will be apparent from the ensuing description and the accompanying drawings to which, however, the scope of the invention is in no way limited.

Figure 1:
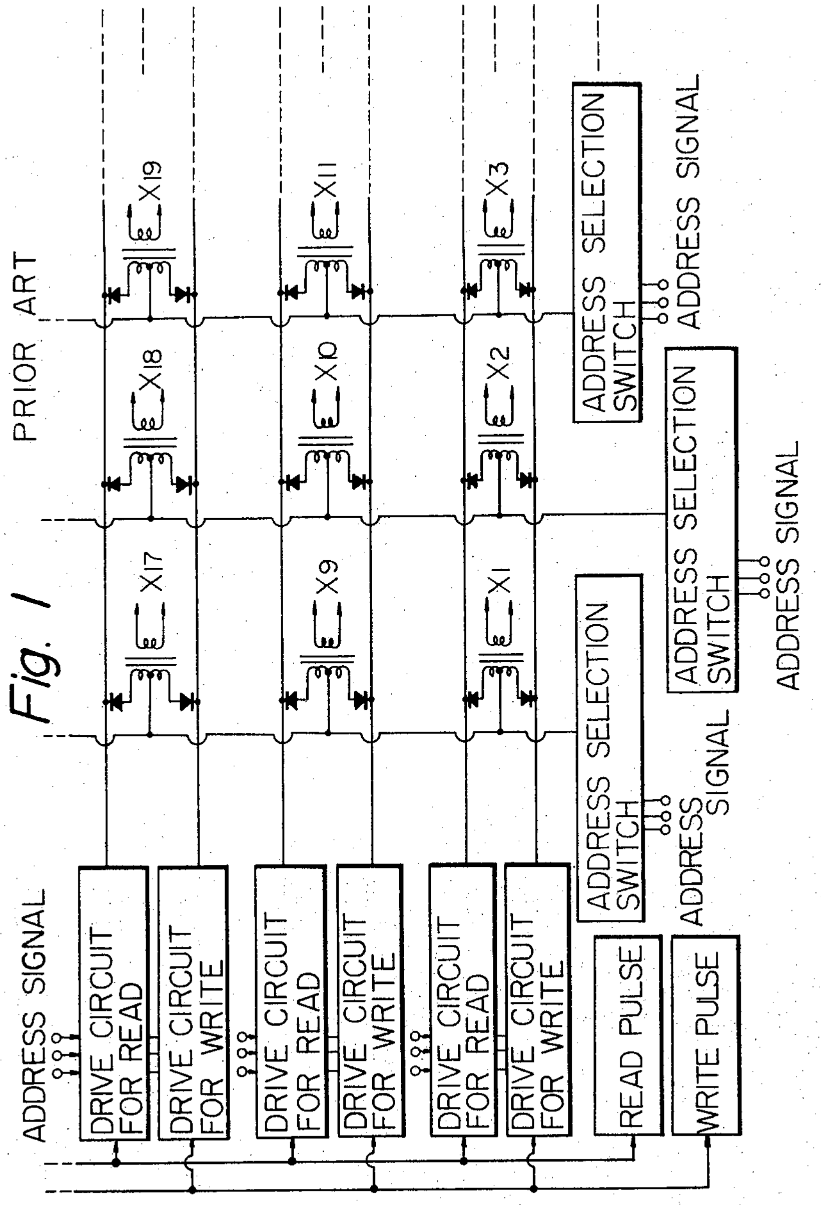
Figure 2:
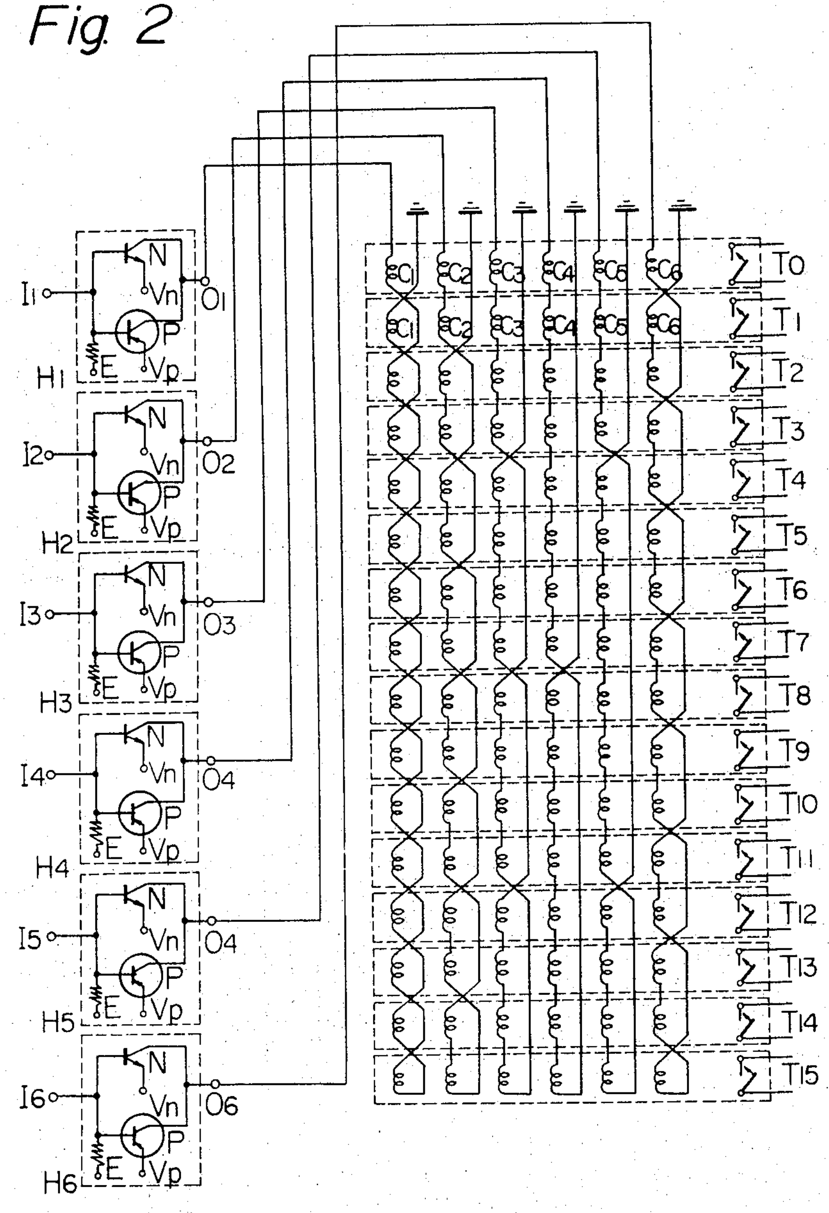
Figure 3A:
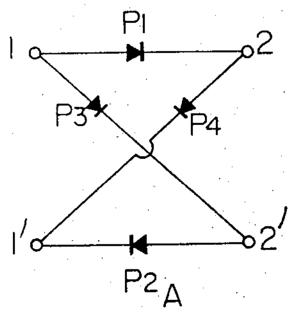
Figure 3B:
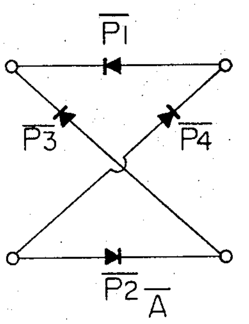
Figure 4:
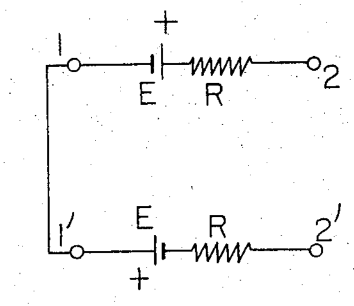
Figure 5:
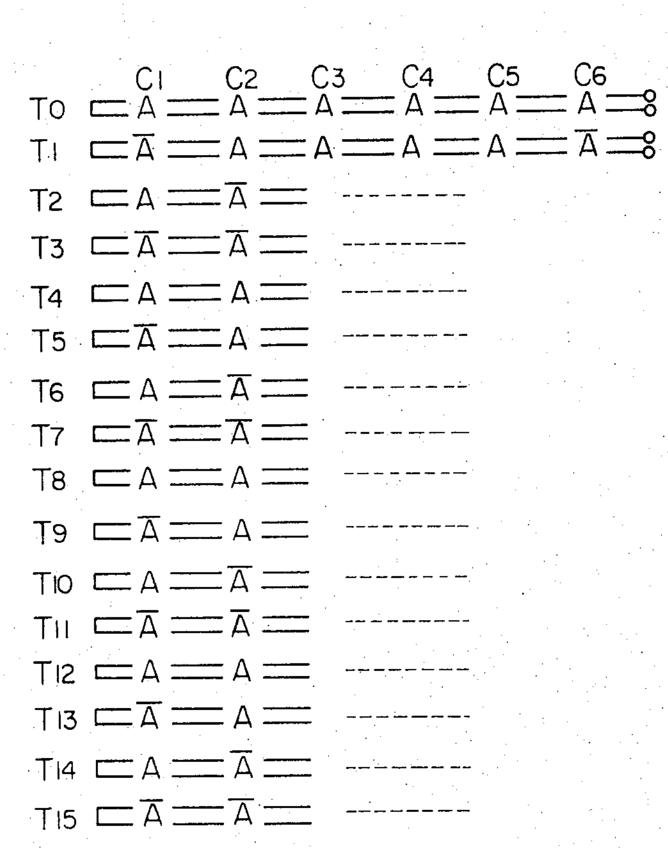
Figure 6:
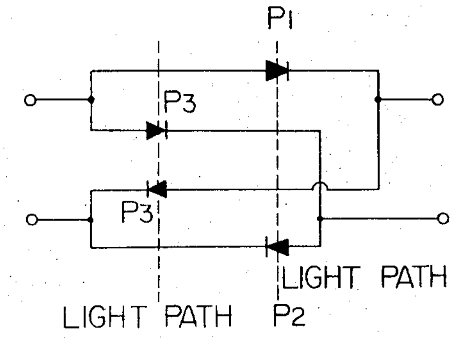
Figure 7:
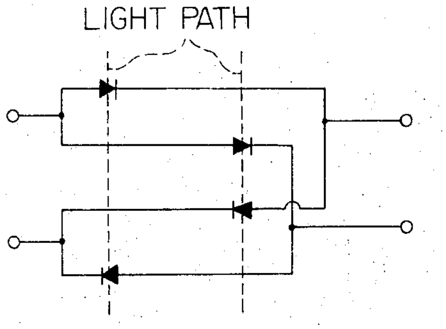
Figure 8A:
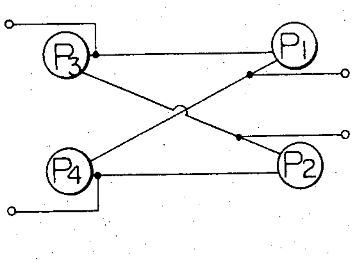
Figure 8B:
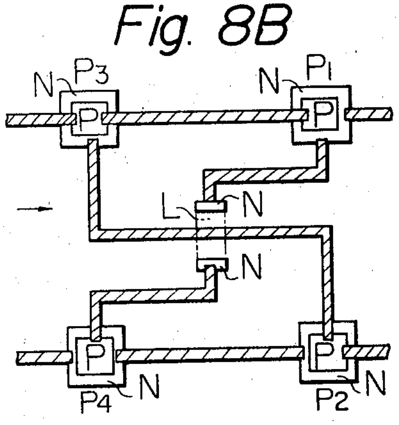
Figure 8C:
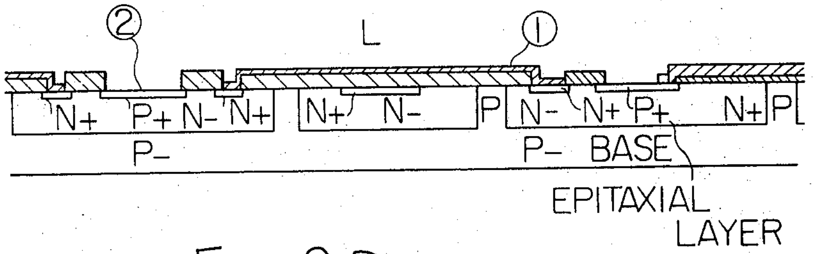
Figure 8D:
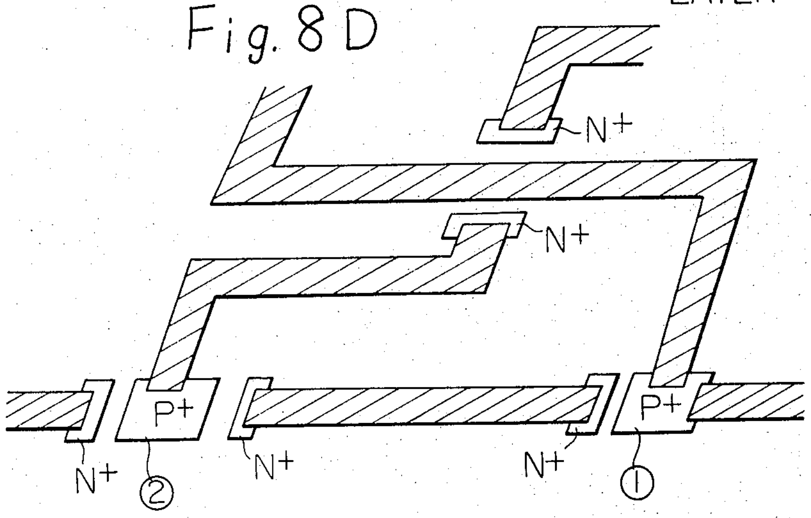
Figure 9A:
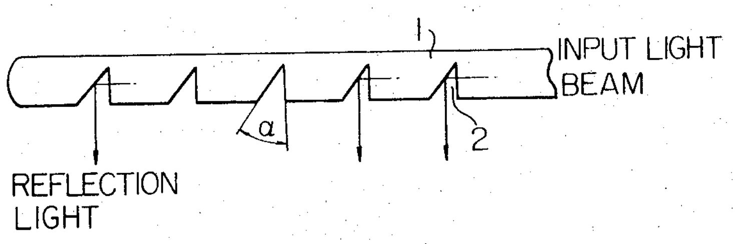
Figure 9B:
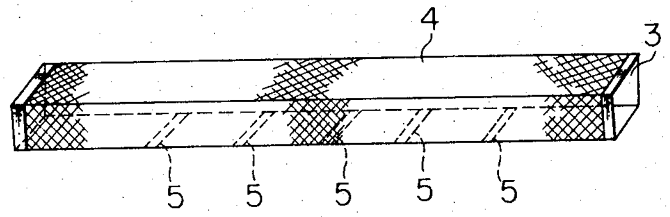
Figure 10:
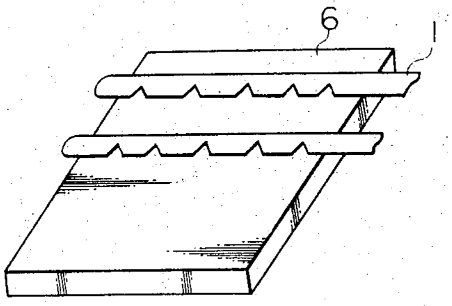

FIG. 1 is a circuit diagram of the address selection circuit according to the prior art, FIG. 2 is a circuit diagram of one embodiment of the present invention, FIGS. 3A and 3B are units of the address selection circuit according to the present invention, FIG. 4 is an equivalent circuit of FIG. 3A, FIG. 5 is a circuit diagram showing the connection of the units of FIG. 3A or FIG. 3B, FIG. 6 is a "unit circuit" which is modified to receive the light beam according to the present invention, FIG. 7 is another modified unit circuit according to the present invention, FIGS. 8A – 8D are one embodiment of the unit circuit of FIG. 3A or FIG. 3B, FIGS. 9A and 9B are one embodiment of a light path, FIG. 10 is the arrangement of light paths used with an integrated circuit, FIGS. 11 – 13A – 13C show some embodiments providing light patterns according to the present invention.

FIG. 1 is a typical circuit diagram of the address selection system of the prior art for a magnetic core memory unit which has a matrix arranged with pairs of diodes and transformers. In this circuit the presence of transformers makes it impossible to construct a unit with integrated circuits, that is impossible to realize the miniaturization and high-reliability of large scale equipment. This invention overcomes the above-mentioned drawback.

Firstly, the principle of the present invention will be described. A part of said principle has already been applied to "Error correcting code" (Japanese Pat. No. 280,892). This invention applies said error correcting code to photo-diode elements. Said error correcting code is first explained following said Japanese Pat. No. 280,892. FIG. 2 is a circuit diagram explaining the principle of the present invention. Sixteen terminals $T_0$ – $T_{15}$ corresponding to 16 addresses are driven by the voltages fed to the six terminals $I_1$ – $I_6$. In this case the terminals of the separate windings $C_1$ – $C_6$ connected as shown operate as driving terminals. All coils of each address are connected in series with one another in a desired polarity, and one end terminal of said series connected coils is connected to one output of one of the transistor circuits $H_1$ – $H_6$. Each transistor circuit is composed of an npn transistor N and pnp transistor P, in parallel each base of which is connected to input terminal $I_1$ – $I_6$, each collector of which is connected to each series connected coil. Terminals E, $V_n$ and $V_p$ are connected to the power supply sources. In said arrangement, when a positive pulse is applied to one of the input terminals $I_1$ – $I_6$, the npn transistor only operates, and when a negative pulse is applied to one of the input terminals of $I_1$ – $I_6$, the pnp transistor only operates. That is to say, the input pulse signal produces a corresponding output pulse signal at one of the output terminals $O_1$ – $O_6$. The polarity of the output pulse signal corresponds to that of the input pulse signal. If the polarities of the coils or the driving terminals $C_1$ – $C_6$ of addresses $T_0$ – $T_{15}$ are designated plus or minus, the polarities of FIG. 2 are as shown in Table 1.

TABLE 1

| Address | Number of coils or drive terminals $C_1$ | $C_2$ | $C_3$ | $C_4$ | $C_5$ | $C_7$ |
|---|---|---|---|---|---|---|
| $T_0$ | + | + | + | + | + | + |
| $T_1$ | – | + | + | + | + | – |
| $T_2$ | + | – | + | + | + | – |
| $T_3$ | – | – | + | + | + | + |
| $T_4$ | + | + | – | + | – | + |
| $T_5$ | – | + | – | + | – | – |
| $T_6$ | + | – | – | + | – | – |
| $T_7$ | – | – | – | + | – | + |
| $T_8$ | + | + | + | – | – | + |
| $T_9$ | – | + | + | – | – | – |
| $T_{10}$ | + | – | + | – | – | – |
| $T_{11}$ | – | – | + | – | – | + |
| $T_{12}$ | + | + | – | – | + | + |
| $T_{13}$ | – | + | – | – | + | – |
| $T_{14}$ | + | – | – | – | + | – |
| $T_{15}$ | – | – | – | – | + | + |

Table 1 is a code table which has 16 addresses $T_0$ – $T_{15}$ and six pairs of driving terminals $C_1$ – $C_6$. The code of Table 1 has the following structure. That is, extracting, address 1 (= $2^0$), 2 (= $2^1$), 4 (= $2^2$) and 8 (= $2^3$) from Table 1, and putting 0 instead of + and 1 instead of – then Table 2 is obtained. In Table 2, the left 4 rows and 4 columns constitute a unit matrix.

TABLE 2

| Address | Number of drive terminals $C_1$ | $C_2$ | $C_3$ | $C_4$ | $C_5$ | $C_6$ |
|---|---|---|---|---|---|---|
| 1 | 1 | 0 | 0 | 0 | 0 | 1 |
| 2 | 0 | 1 | 0 | 0 | 0 | 1 |
| 4 | 0 | 0 | 1 | 0 | 1 | 0 |
| 8 | 0 | 0 | 0 | 1 | 1 | 0 |

In Table 2, if each of the 4 addresses is regarded as a base vector, generating $2^4 = 16$ vectors from said base vectors which constitute an Abelian group of modulo 2, then by putting + instead of 0, and – instead of 1, Table 1 is obtained again. That is to say, Table 1 can be generated from Table 2. The vecto of Table 1 constitutes an Abelian group as far as it is considered a binary vector. The set of said vectors is, then, closed, and thus the sum of any two vectors always belongs to the set. For instance, $T_1 + T_3 = T_2$. In Table 1, putting +1 instead of +, and –1 instead of –, the arithmetic sum of the elements of each vector and the absolute value of said sum are shown in Table 3.

TABLE 3

| Address | Sum of vectors | Absolute of sum |
|---|---|---|
| $T_0$ | 6 | 6 |
| $T_1$ | 2 | 2 |
| $T_2$ | 2 | 2 |
| $T_3$ | 2 | 2 |
| $T_4$ | 2 | 2 |
| $T_5$ | −2 | 2 |
| $T_6$ | −2 | 2 |
| $T_7$ | −2 | 2 |
| $T_8$ | 2 | 2 |
| $T_9$ | −2 | 2 |
| $T_{10}$ | −2 | 2 |
| $T_{11}$ | −2 | 2 |
| $T_{12}$ | 2 | 2 |
| $T_{13}$ | −2 | 2 |
| $T_{14}$ | −2 | 2 |
| $T_{15}$ | −2 | 2 |

In Table 3, the absolute value is 6 for only $T_0$, and 2 for others. Generally, when addition is made of any one of th 16 vectors, the absolute value of the sum of the elements is 2 except for only one element which is 6, which can be proved mathematically (in this case the value of the sum is 2, but it is generally equal to or less than 2). The mathematical analysis will be shown later, and more details are discussed in a paper entitled, "Application of Error-Correcting Codes to Multi-Way Switching" by H. Takahasi and E. Goto; Proc. of Unesco Information Processing Conference, Paris, 1959.

It has been well known (i.e., "Error Correcting Codes" by W, Esley, Peterson, MIT Press, 1962) that if the distance between codes is more than $r + 1$, it is possible to detect the errors of less than $r$, and if the distance between codes is more than $2r + 1$, it is possible to correct the errors of less than $r$, as the distance between error code including $r$ errors and correct code is $r$. It should be understood that the least distance between codes of table 1 is 2, by substituting 0 and 1 for the corresponding + and − respectively. From this fact it should be understood that the above mentioned code could completely detect one error. The above mentioned code is a simple example which briefly explains the principle of address selection system. In mathematical analysis described later the essential feature of said code and error correcting code capable of correcting 2 errors by utilizing the feature of the code will be explained in detail.

FIG. 3A shows a unit circuit according to the present invention. In FIG. 3A, four diodes $P_1$, $P_2$, $P_3$ and $P_4$ in a four terminal network are photo-diodes all of the same characteristics. The light illuminating the injection part of said photo-diodes induces a photoelectromotive force E. The internal resistance of a photodiode is low when it is illuminated, and high when not illuminated. Consequently when terminals 1 and 1′ are short circuited and when diodes $P_1$ and $P_2$ are illuminated, and when diodes $P_3$ and $P_4$ are dark in FIG. 3A, the circuit of FIG. 3A from the terminals 2 and 2′ is equivalent to circuit 4, where R is the internal resistance of an illuminated photo-diode. The circuit of FIG. 4 is the same as a battery of electromotive force 2E, and internal resistance 2R. In the converse condition as above when diodes $P_1$ and $P_2$ are dark, and diodes $P_3$ and $P_4$ are illuminated, a battery of electromotive force −2E and internal resistance 2R is obtained.

The circuit of FIG. 3B which is the same as that of FIG. 3A except for the direction of the photo-diodes has an electromotive force in the reverse direction from that of FIG. 3A, which is made by changing the series arm and grid arm as shown in FIG. 3A and FIG. 3B.

We indicate the circuit of FIG. 3A by A and we indicate FIG. 3B by $\bar{A}$. The relation between A and $\bar{A}$ corresponds to the polarity of the coils in FIG. 1.

Next, the circuits A and $\bar{A}$ of FIG. 3A and FIG. 3B are put, in the places, corresponding to + or − of Table 1, and the 6 four terminal networks are connected in series in turn according to Table 1 and the extreme left hand terminals are closed and the extreme right hand terminals are open. FIG. 5 shows said series circuits of Table 1, which shows for easy understanding only the first two rows and the first two columns of Table 1. Each line of FIG. 5 is called an address circuit.

Now, six pairs of light beams illuminate said photodiodes along said six columns. The light for one column, however, illuminates only the photo-diodes of the series arms $T_0 - T_{15}$, or those of the grid arms $T_0 - T_{15}$. The non-illuminated photo-diodes are in the dark. The selection of which kind of arm is illuminated is decided in the following way. Supposing unit $C_i$ is illuminated in the series arm, and unit $\overline{C_i}$ is illuminated in the grid arm, and inserting $C_i$ for + and $\overline{C_i}$ for in Table 1 one of the 16 vectors of Table 1 must be obtained. In the above method, there are 16 patterns of illumination, which correspond to Table 1. Then, from the mathematical theory, when a selection from the 16 patterns is made the selected address provides an electromotive force of $6 \times 2E = 12E$ with an internal resistance 12R at the extreme right hand terminal, and the other addresses provide an electromotive force of absolute value 4E with internal resistance 12R. Then, any known means which can distinguish 12E from 4E may be used to select one address from the 16 addresses.

For instance, when $C_1$ and $C_6$ are illuminated in the grid arms, and $C_2$, $C_3$, $C_4$ and $C_5$ are illuminated in the series arms, the electromotive force of every address is shown in Table 4. From Table 4, the electromotive force of $T_1$ is 12E and that of the others is +4E, then, $T_1$ is selected in this case.

TABLE 4

| | $C_1$ $C_2$ | $C_3$ | $C_4$ | $C_5$ | $C_6$ | Total |
|---|---|---|---|---|---|---|
| $T_0$ | −2E+2E | +2E | +2E | +2E | −2E | +4E |
| $T_1$ | +2E+2E | +2E | +2E | +2E | +2E | +12E |
| $T_2$ | −2E−2E | +2E | +2E | +2E | +2E | +4E |
| $T_3$ | +2E−2E | +2E | +2E | +2E | −2E | +4E |
| $T_4$ | −2E+2E | −2E | + 2E | −2E | −2E | −4E |
| $T_5$ | +2E+2E | −2E | +2E | −2E | +2E | +4E |
| $T_6$ | −2E−2E | −2E | +2E | −2E | +2E | −4E |
| $T_7$ | +2E−2E | −2E | +2E | −2E | −2E | −4E |
| $T_8$ | −2E+2E | +2E | −2E | −2E | −2E | −4E |
| $T_9$ | +2E+2E | +2E | −2E | −2E | + 2E | +4E |
| $T_{10}$ | −2E−2E | +2E | −2E | −2E | +2E | −4E |
| $T_{11}$ | +2E−2E | +2E | −2E | −2E | −2E | −4E |
| $T_{12}$ | −2E+2E | −2E | −2E | +2E | −2E | −4E |
| $T_{13}$ | +2E+2E | −2E | −2E | +2E | +2E | +4E |
| $T_{14}$ | −2E−2E | −2E | +2E | | +2E | −4E |
| $T_{15}$ | +2 E−2E | −2E | −2E | +2E | −2E | −4E |

The means to illuminate the photo-diodes is provided by the selection of pairs of elements from known discharge tubes, incondescent lamps, gas lasers, crystal lasers, semiconductor lasers, or light emitting diodes. Said means is also provided by an ordinary light source via light valves.

According to the above-mentioned principle of the address selection system of the present invention, the practical configuraton of the 4 terminal networks A and $\bar{A}$ of FIG. 3 and FIG. 3B is shown in FIG. 6. The practical configuration of $\bar{A}$ is also shown in FIG. 7. The main point of FIG. 6 and FIG. 7 is that four diodes are arranged in such a way that a pair of series arm diodes and a pair of grid arm diodes each lie on a straight line respectively, and there must not be a point of intersection between the series arm light beam and the grid arm light beam.

FIG. 8A – 8D show how to construct the silicon integrated circuit of the 4 terminal networks of FIG. 6. FIG. 8A is a modified circuit of FIG. 6, FIG 8B is the arrangement of the pattern of said integrated circuit. The integrated circuit of FIG. 8B can be manufactured by known methods such as the epitaxially growth process, diffusion process and/or photocorrosion process. FIG. 8C is a cross section view of FIG. 8B, and FIG. 8D is a plane view of FIG. 8D which shows the part exposed from the $SiO_2$ layer only. The short circuit at the left hand end of FIG. 5 is easily provided and is not explained here. A large scale integrated circuit which provides the performance of FIG. 5 in one element is possible. It is also possible to achieve the performance of FIG. 5 by integrated circuits divided into several chips because of the excessively large size of one single integrated circuit. It will be well understood that the scope of the present invention is not limited to the embodiments in FIG. 8A – FIG. 8D, MOS type integrated circuits are also applicable as well as bipolar type integrated circuits. The 4 terminal network of FIG. 7 is provided in the same way as the above.

There are many prior arts on how to illuminate diodes with a light beam, some of which are applicable to the present invention. FIG. 9A and FIG. 9B show a new means comprising optical fiber 1 which makes it easy to constitute such means with integrated circuits. In FIG. 9A, the light beam from the laser light source goes through the fiber 1 and branches at intermediate windows 2 which are cut along the fiber 1 and then goes to the junction parts of the photodiodes. FIG. 9B is another embodiment of a fiber. In FIG. 9B, the optical fiber scope 3 is covered with reflection film 4 under which there are provided windows 5. The fiber 1 of FIG. 9A can be arranged on the silicon integrated circuit board 6 shown in FIG. 10. In FIG. 10, the pattern of the light beam is provided with a known logic circuit corresponding to each of 4 bit address signals thus identifying one of $T_0 - T_{15}$. In applying FIG. 9 (FIG. 9A or FIG. 9B) and FIG. 10 to FIG. 5, twelve fiber each of which has 32 windows are needed.

Figure 11:
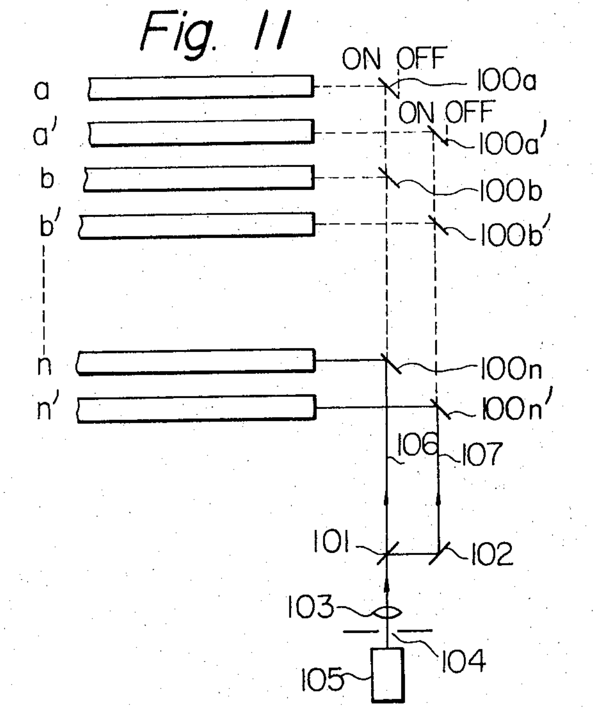

FIG. 11 shows one embodiment for providing a desired light pattern. In FIG. 11, pairs of optical fiber *a*, *a'*, *b*, *b'*, *c*, *c'*, . . . . *n*, *n'* are provided, which correspond to the optical fibers of FIG. 9 or FIG. 10. In each pair of optical fibers, optical fiber *a*, *b*, *c*, . . . . *n* are used to illuminate the series arm photo-diodes, and optical fibers *a'*, *b'*, *c'*, . . . . *n'* are used to illuminate the grid arm photo-diodes. A plain mirror is provided corresponding to each optical fiber one to one, for instance, plain mirror 100*a* corresponds to optical fiber 100, plain mirror 100*a* ' corresponds to optical fiber 100', and so on. Plain mirrors, generally shown by reference number 100, are each driven into the ON or OFF condition by corresponding electro-magnetic coils (not shown). When one of the plain mirrors 100 is in the ON condition, light beam 106 and 107 can be reflected by said mirror and pass through the corresponding optical fiber. While if one of the plain mirrors 100 is in the OFF condition, the light beam can not go through the corresponding optical fiber. Light beams 106 and 107 constitute means comprising a light source 105, a slit 104, a lens 103, a mirror 102 and a half-transparent mirror 101.

Figure 12:
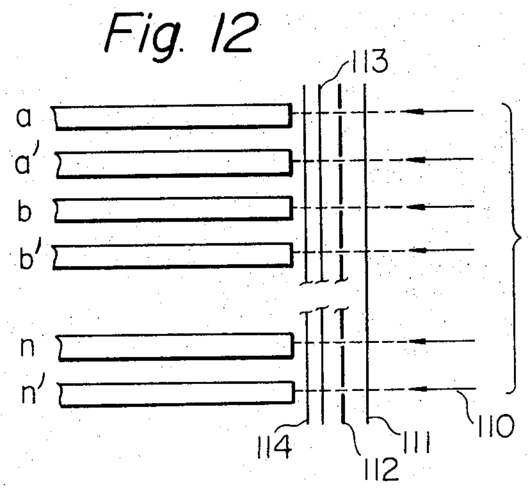
Figure 13A:
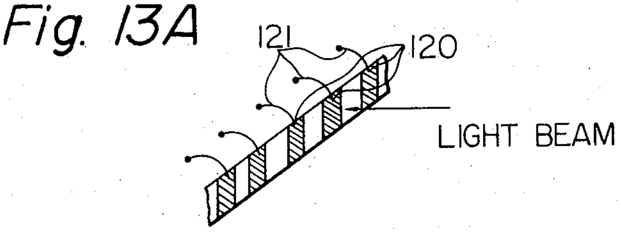
Figure 13B:
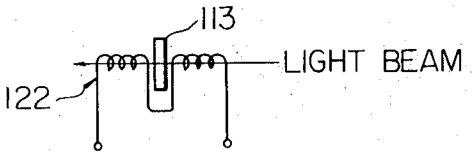
Figure 13C:
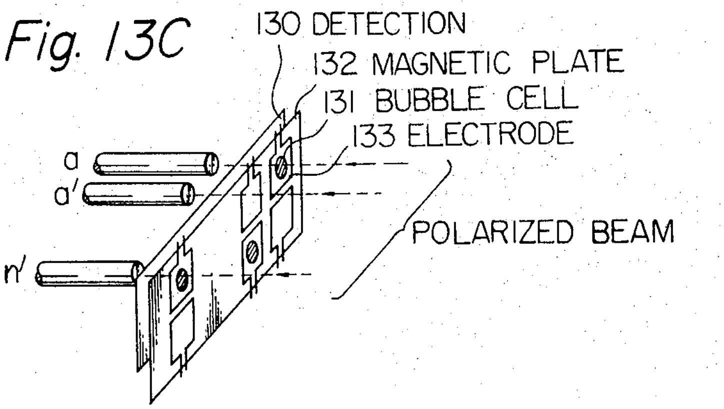

FIG. 12 shows another embodiment for providing the desired light pattern. In FIG. 12, a parallel light beam 110 goes to optical fibers *a*, *a'*, *b*, *b'*, . . . . *n*, *n'* through a polarizing plate 111, an opaque plate with a plurality of slits, an optic crystal 113 and detection plate 114. An optic crystal can be either an electro-optic crystal or a magneto-optic crystal. In the case of an electro-optic crystal, a pair of electrodes 120 and leads 121 are provided corresponding to optical fibers *a*, *a'*, *b*, *b'*, . . . . *n*, *n'* shown in FIG. 13A. While in the case of a magneto-optic crystal, exciting coils 122 are provided corresponding to optical fibers *a*, *a'*, *b*, *b'*, . . . . *n*, *n'* shown in FIG. 13B. The voltage V or −V applied to the electrode 120 or the coil 122 controls the switching operation for a polarized light beam to the optical fibers through the polarizing plate 111 and optic crystal 113. That is to say, the optic crystal 113 serves as a shutter for the light beam. To control the polarized light beam as to whether it reaches the optical fibers or not, the optical axis of the polarizing plate 111 is adjustable. Adjusting said optical axis, it is possible to arrange the plane polarized wave of the light beam from said detection plate 114 illuminates the magnetic bubble domain cells by the output beam from the glass fibers.

In an embodiment of FIG. 12, a magnetic plate with magnetic bubble domain cells is used instead of an optic crystal 113. In said case the magnet bubble domain cells operate as an optical shutter. That is to say, an electric current through the electrodes of the magnetic bubble domain cells controls the state of the magnetic bubble domain cells, which control the polarized light beam as to whether it can go through the detection plate 114 or not.

As mentioned above the address selection system according to the present invention is composed of integrated circuits, and moreover with photo-diodes, PiN silicon diodes with very short delay time for quick short pulses. As laser beams with very fast switching times can be used for a light beam pulse, the address selection system according to the present invention will provide very high speed memory system with short cycle time.

The output voltage of the present address selection system is rather high, as it is the sum of the output voltages of each diode. And, it can drive the memory system directly. If the output voltage is insufficient, known amplifiers can be used.

In the above explanation, a simple code is taken for the embodiment. Any other error correcting code is applicable so long as the value of the ratio of the output voltage of the selected address to that of the unselected address is greater than specified value, for example 3. The important codes which satisfy said condition are shown in Table 5.

TABLE 5

| Number | 1 | 2 | 3 | 4 | 5 | 6 | 7 |
|---|---|---|---|---|---|---|---|
| M | 2 | 16 | 16 | 64 | 64 | 256 | 2048 |
| n | 3 | 6 | 9 | 12 | 15 | 18 | 24 |

In Table 5, M is the number of addresses, and $n$ is the number of driving terminals.

Another embodiment of the generating vector for error correcting codes is as follows.

Code Number 1

$$[1\ \ 0\ \ 0]$$

Code Number 2

The same as Table 2

Code Number 3

$$\begin{bmatrix} 1&0&0&0&1&1&0&1&0 \\ 0&1&0&0&1&0&1&1&0 \\ 0&0&1&0&1&1&0&0&0 \\ 0&0&0&1&0&1&1&0&0 \end{bmatrix}$$

Code Number 4

$$\begin{bmatrix} 1&0&0&0&0&0&1&1&1&0&0&0 \\ 0&1&0&0&0&0&1&1&0&1&0&0 \\ 0&0&1&0&0&0&1&0&1&1&0&0 \\ 0&0&0&1&0&0&0&1&1&1&0&0 \\ 0&0&0&0&1&0&1&1&0&0&1&0 \\ 0&0&0&0&0&1&0&0&1&1&1&0 \end{bmatrix}$$

Code Number 5

$$\begin{bmatrix} 1&0&0&0&0&0&1&1&0&0&1&1&0&0&0 \\ 0&1&0&0&0&0&1&1&0&1&0&1&1&0&0 \\ 0&0&1&0&0&0&1&0&1&1&0&0&1&1&0 \\ 0&0&0&1&0&0&0&1&1&1&1&0&0&1&0 \\ 0&0&0&0&1&0&1&0&1&0&1&0&1&0&0 \\ 0&0&0&0&0&1&1&1&1&1&1&1&1&1&0 \end{bmatrix}$$

Code Number 6

$$\begin{bmatrix} 1\,0\,0\,0 & 0\,0\,0\,0 & 1\,0\,0\,0 & 0\,1\,1\,1\,1\,0 \\ 0\,1\,0\,0 & 0\,0\,0\,0 & 0\,1\,0\,0 & 1\,0\,1\,1\,1\,0 \\ 0\,0\,1\,0 & 0\,0\,0\,0 & 0\,0\,1\,0 & 1\,1\,0\,1\,1\,0 \\ 0\,0\,0\,1 & 0\,0\,0\,0 & 0\,0\,0\,1 & 1\,1\,1\,0\,1\,0 \\ 0\,0\,0\,0 & 1\,0\,0\,0 & 0\,1\,1\,1 & 1\,1\,0\,0\,0\,0 \\ 0\,0\,0\,0 & 0\,1\,0\,0 & 1\,0\,1\,1 & 0\,1\,1\,0\,0\,0 \\ 0\,0\,0\,0 & 0\,0\,1\,0 & 1\,1\,0\,1 & 0\,0\,1\,1\,0\,0 \\ 0\,0\,0\,0 & 0\,0\,0\,1 & 1\,1\,1\,0 & 1\,0\,0\,1\,0\,0 \end{bmatrix}$$

Code Number 7

$$\begin{bmatrix} 1&0&0&0&0&0&0&0&0&0&0&1&1&0&1&1&1&0&0&0&1&0&1&0 \\ 0&1&0&0&0&0&0&0&0&0&0&1&0&1&1&1&0&0&0&1&0&1&1&0 \\ 0&0&1&0&0&0&0&0&0&0&0&0&1&1&1&0&0&0&1&0&1&1&1&0 \\ 0&0&0&1&0&0&0&0&0&0&0&1&1&1&0&0&0&1&0&1&1&0&1&0 \\ 0&0&0&0&1&0&0&0&0&0&0&1&1&0&0&0&1&0&1&1&0&1&1&0 \\ 0&0&0&0&0&1&0&0&0&0&0&1&0&0&0&1&0&1&1&0&1&1&1&0 \\ 0&0&0&0&0&0&1&0&0&0&0&0&0&1&1&0&1&1&0&1&1&1&1&0 \\ 0&0&0&0&0&0&0&1&0&0&0&0&0&0&0&1&1&0&1&1&1&0&1&0 \\ 0&0&0&0&0&0&0&0&1&0&0&0&1&1&1&1&0&1&1&1&0&0&1&0 \\ 0&0&0&0&0&0&0&0&0&1&0&1&0&1&1&0&1&1&1&0&0&0&1&0 \\ 0&0&0&0&0&0&0&0&0&0&1&0&1&0&0&1&1&1&0&0&0&1&1&0 \end{bmatrix}$$

In the above explanation, photo electromotive voltage is used for convenience, however, photo electromotive current can also be used in the present invention. Moreover, the left hand end terminals of the circuit in FIG. 5 can be connected together by an impedance instead of a wire. In the case when the number of addresses is less than $2^m$, only necessary address selection circuits are used, while in the case when the number of addresses $2^m$ is large, it is possible to divide the integrated circuits into several parts for ease of manufacture.

From the foregoing it will now be apparent that a new and improved address selection system has been found. It should be understood of course that the embodiment disclosed is merely illustrative and is not intended to limit the scope of the invention in any way.

Finally, a mathematical explanation and proof is described in relation to the address selection system according to the present invention.

Two binary vectors $x_1$ and $x_2$ are defined as follows;

$$x_1 = (x_{11}, x_{12}, \ldots, x_{1n}) \qquad (1)$$
$$x_2 = (x_{21}, x_{22}, \ldots, x_{2n})$$

where a binary vector means that each element of said binary vector $x_{ij}$ ($i = 1, 2$; $j = 1, 2, \ldots, n$) can be only 0 or 1, which may be expressed in the terminology of set theory as follows;

$$x_{ij} \in B \qquad (2)$$
$$B = \{0, 1\} \qquad (3)$$

Formula (2) means $x_{ij}$ belongs to B and formula (3) means that B equals the set whose members are zero or one.

Next, the addition between $x_{1j}$ and $x_{2j}$ is defined as follows;

$$x_{1j} + x_{2j} \equiv x_{3j} \pmod 2 \qquad (4)$$

Formula (4) is briefly expressed as follows;

$$x_{1j} + x_{2j} = x_{3j} \qquad (5)$$

In this case $x_{3j}$ is also only 0 or 1. That is to say, in set theory terminology, $$x_{3j} \in B \qquad (6)$$

Further, the binary vector $x_3$ is defined as follows;

$$x_3 = (x_{31}, x_{32}, \ldots, x_{3n}) \qquad (7)$$

and the formula (5) is supposed to be satisfied for $j = 1, 2, \ldots n$, then the addition between vectors is defined as follows;

$$x_1 + x_2 = x_3 \qquad (8)$$

The set of said binary vectors constitutes a group defined by formula (8). This group is called an additive group or Abelian group because the commutative raw holds.

On the other hand, in said add group of said binary vectors, the vector $x_i$ which satisfies the next formula is called a zero element and expressed as $\mathbb{O}$ $$x_{ij} = 0, j = 1, 2, \ldots, n \qquad (9)$$

which corresponds to 0 in ordinary algebra. Generally $$x_i + x_i = \mathbb{O} \qquad (10)$$

Next, said element $x_{ij}$ is substituted by $\tilde{x}_{ij}$, where the value of an element is set to 1 instead of 0, and −1 instead of 1 in any element of a binary vector $x_i$. And the vector which has elements $\tilde{x}_{ij}$ is expressed as $\tilde{x}_i$. Zero element $\tilde{\mathbb{O}}$ is defined as follows corresponding to $\mathbb{O}$ ;

$$\tilde{\mathbb{O}} = (1, 1, \ldots, 1)$$

Further, the relation between $x_{ij}$ and $\tilde{x}_{ij}$ is expressed by the next formula;

$$(-1)^{x_{ij}} = \tilde{x}_{ij} \qquad (11)$$

An inner product can be made from vectors $\tilde{x}_i$ as in ordinary real vectors, and the next formula holds good, $$(\tilde{x}_1, \tilde{x}_2) = (\tilde{x}_2, \tilde{x}_1)$$
$$= \tilde{x}_{11}\tilde{x}_{21} + \tilde{x}_{12}\tilde{x}_{22} + \ldots\ldots\ldots + \tilde{x}_{1n}\tilde{x}_{2n}$$
$$= (-1)^{x_{11} + x_{21}} + (-1)^{x_{12} + x_{22}} + \ldots + (-1)^{x_{1n} + x_{2n}}$$

; and from the relation of formula (8);

$$(\tilde{x}_1, \tilde{x}_2) = (-1)^{x_{31}} + (-1)^{x_{32}} + \ldots + (-1)^{x_{3n}} \qquad (12)$$

If $x_3 = \mathbb{O}$ , then formula (12) is;

$$(\tilde{x}_1, \tilde{x}_2) = (-1)^0 + (-1)^0 + \ldots\ldots\ldots + (-1)^0 = n$$

where the right hand member of formula (12) is called the weight of the vector $x_3$, which is expressed as;

$$W(x_3) = (-1)^{x_{31}} + (-1)^{x_{32}} + \ldots + (-1)^{x_{3n}} \qquad (13)$$

The formula (12) translates to;

$$(\tilde{x}_1, \tilde{x}_2) = W(x_1 + x_2) \qquad (14)$$

Now, let us consider the error correcting code for an address selection system. This code is an additive group whose element is binary vector, and who contains only one element whose weight is $n$. The size of said code M is expressed by the positive integer $m$ as follows;

$$M = 2^m \quad m < n \qquad (15)$$

The additive group A of said code is;

$\{A = x_1, x_2, \ldots, x_M\}$ and if $x_i \in A$ is satisfied, the next formulas hold good;

$$W(x_i) = n \ldots x_i = \Phi \qquad (16)$$

$$|W(x_i)| < n \ldots x_i \neq \Phi$$

Particularly, in the present invention, the following formula holds good, $$|W(x_i)| \leqq n/3 \ldots x_i \neq \phi$$

In the present invention, the selection of the light path whether series arm or grid arm of FIG. 6 or FIG. 7, is performed for n pairs of light paths. This selection corresponds to selecting a desired vector $\bar{x}_j$. Further, the output voltage appearing at the output terminals of FIG. 5 corresponds to an inner product between a particular vector and any other vector of the group. Accordingly, from the above-mentioned theory, the output terminal corresponding to $\bar{x}_i$ is selected. Further, there are many kinds of codes which have the above-mentioned characteristics, It is possible to constitute the error correcting code having the above mentioned feature. One example of such code is shown in table 6, which code has been proposed in Japanese Pat. No. 222909, and is capable of correction of 2 errors when selecting one of 16 addresses. The detailed discussion of said code is shown in Japanese Pat. No. 222909. In the code in Table 6, the code length is 11 and the least distance between codes is 5, therefore, it is apparent that the code in Table 6 can correct 2 errors by the above-mentioned reason ($2 \times 2 + 1 = 5$). It is also apparent that the code is an Abelian group of module 2.

For example

Address 5 = ( 1 0 1 0 1 0 1 0 1 0 1)

+) Address 9 = ( 1 0 0 1 1 1 1 0 1 1 0)

Address 12 = ( 0 0 1 1 0 1 0 0 0 1 1), (mod 2)

It is possible to constitute other address codes by arithmetic module 2 from address codes 1, 2, 4 and 8 ($2^4 = 16$).

For example

Address 1 = (1 0 0 0 0 0 0 1 1 1 1)

+)Address 2 = (0 1 0 0 1 1 0 1 1 0 0)

Address 3 = (1 1 0 0 1 1 0 0 0 1 1), (mod 2) From the above explanation it is apparent that an address selection system is possible using an error correcting code capable of correction of 2 errors by substituting + and − for 0 and 1 in Table 6.

TABLE 6

| Address | Number of drive terminal | | | | | | | | | | |
|---|---|---|---|---|---|---|---|---|---|---|---|
| | 1 | 2 | 3 | 4 | 5 | 6 | 7 | 8 | 9 | 10 | 11 |
| 0 | 0 | 0 | 0 | 0 | 0 | 0 | 0 | 0 | 0 | 0 | 0 |
| 1 | 1 | 0 | 0 | 0 | 0 | 0 | 0 | 1 | 1 | 1 | 11 |
| 2 | 0 | 1 | 0 | 0 | 1 | 1 | 0 | 1 | 1 | 0 | 0 |
| 3 | 1 | 11 | 0 | 0 | 1 | 1 | 0 | 0 | 0 | 1 | 1 |
| 4 | 0 | 0 | 1 | 0 | 1 | 0 | 1 | 1 | 0 | 1 | 0 |
| 5 | 1 | 0 | 1 | 0 | 1 | 0 | 1 | 0 | 1 | 0 | 1 |
| 6 | 0 | 1 | 1 | 0 | 0 | 1 | 1 | 0 | 1 | 1 | 0 |
| 7 | 1 | 1 | 1 | 0 | 0 | 1 | 1 | 1 | 0 | 0 | 1 |
| 8 | 0 | 0 | 0 | 1 | 1 | 1 | 1 | 1 | 0 | 0 | 1 |
| 9 | 1 | 0 | 0 | 1 | 1 | 1 | 1 | 0 | 1 | 1 | 0 |
| 10 | 0 | 1 | 0 | 1 | 0 | 0 | 1 | 0 | 1 | 0 | 1 |
| 11 | 1 | 1 | 0 | 1 | 0 | 0 | 1 | 1 | 0 | 1 | 0 |
| 12 | 0 | 0 | 1 | 1 | 0 | 1 | 0 | 0 | 0 | 1 | 11 |
| 13 | 1 | 0 | 1 | 1 | 0 | 1 | 0 | 1 | 1 | 0 | 0 |
| 14 | 0 | 1 | 1 | 1 | 1 | 0 | 0 | 1 | 1 | 1 | 1 |
| 15 | 1 | 1 | 1 | 1 | 1 | 0 | 0 | 0 | 0 | 0 | 0 |

What is claimed is:

1. An address selection system, comprising:

a plurality of address circuits the number of which corresponds to the number of addresses of a memory system, said address circuits being provided with a plurality of unit circuits each comprising a pair of series arms and a pair of grid arms, each of said pairs of arms having two photoelectromotive conversion elements, the polarity of electromotive force of said photoelectromotive conversion elements being determined by an error correcting code configuration which relates to an Albelian group, said address circuits being arranged in a manner such that said photo-electromotive conversion elements provide an electromotive force and reduce their inner resistance by a light beam illuminating said photo-electromotive conversion elements, said light beam having a light pattern corresponding to a selected address and, one of said address circuits when selected by said light beam providing an output signal the absolute value of which is larger than the absolute values of the output signals of any other unselected address circuit.

2. An address selection system according to claim 1, wherein one end of each address circuit is short-circuited with conductive means, the impedance of which is finite for each of said address circuits.

3. An address selection apparatus according to claim 1, wherein said unit circuits and said address circuits are constructed with integrated circuits.

4. An address selection system according to claim 1, wherein said means to illuminate said photo-electromotive conversion elements comprises a laser light source and optical fiber.

5. An address selection system according to claim 4, wherein said optical fiber has a plurality of windows at right angles to the axis of the light beam.

6. An address selection system according to claim 4, wherein said optical fiber is covered with a reflecting film.

7. An address selection system according to claim 1, wherein said photo-electromotive conversion elements are photo-diodes.

8. An address selection system according to claim 1, wherein said means to illuminate said photo-electromotive conversion elements comprises a plurality of plain mirrors arranged to be driven by corresponding electro-magnetic coils.

9. An address selection system according to claim 1, wherein said means to illuminate said photo-electromotive conversion elements comprises, along the light path, a polarizing plate, an opaque plate with a plurality of slits, an electro-optic crystal with a plurality of electrodes, and a detection plate, each arranged in turn.

10. An address selection system according to claim 1, wherein said means to illuminate said photo-electromotive conversion elements comprises, along the light path, a polarizing plate, an opaque plate with a plurality of slits, a magneto-optic crystal disposed in a coil, and a detection plate, each arranged in turn.

11. An address selection system according to claim 1, wherein said means to illuminate said photo-electromotive conversion elements comprises, along the light path, a polarizing plate, an opaque plate with a plurality of slits, a magnetic plate with bubble cells, and a detection plate, each arranged in turn.

* * * * *